(12) United States Patent
Isaji et al.

(10) Patent No.: US 11,799,175 B2
(45) Date of Patent: Oct. 24, 2023

(54) POWER SUPPLY DEVICE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Isaji, Mie (JP); Hiroshi Shimizu, Mie (JP); Ryoya Okamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 504 days.

(21) Appl. No.: 17/053,552

(22) PCT Filed: May 15, 2019

(86) PCT No.: PCT/JP2019/019308
§ 371 (c)(1),
(2) Date: Nov. 6, 2020

(87) PCT Pub. No.: WO2019/225436
PCT Pub. Date: Nov. 28, 2019

(65) Prior Publication Data
US 2021/0242542 A1 Aug. 5, 2021

(30) Foreign Application Priority Data
May 23, 2018 (JP) .............................. 2018-098628

(51) Int. Cl.
*H01M 50/507* (2021.01)
*H01M 50/209* (2021.01)
(Continued)

(52) U.S. Cl.
CPC ....... *H01M 50/507* (2021.01); *H01M 50/209* (2021.01); *H01M 50/224* (2021.01);
(Continued)

(58) Field of Classification Search
CPC .. H01M 50/507; H01M 50/50; H01M 50/209; H01M 50/298; H01M 50/503; H01M 50/224; H01M 50/55
See application file for complete search history.

(56) References Cited

U.S. PATENT DOCUMENTS 10,673,049 B2  6/2020  Ogasawara et al.
2008/0314657 A1  12/2008  Ikeda et al.
(Continued)

FOREIGN PATENT DOCUMENTS

JP  2009-004323  1/2009
JP  5163804  3/2013
(Continued)

OTHER PUBLICATIONS

Official Communication issued in International Bureau of WIPO Patent Application No. PCT/JP2019/019308, dated Aug. 20, 2019, along with an English translation thereof.

*Primary Examiner* — Jane J Rhee
(74) *Attorney, Agent, or Firm* — GREENBLUM & BERNSTEIN, P.L.C.

(57) ABSTRACT

A power supply device disclosed by the present specification includes: a first power storage element group that has a pair of first external terminals having different polarities, and includes a plurality of power storage elements; and a second power storage element group that has a pair of second
(Continued)

external terminals having different polarities, and includes a plurality of power storage elements. The first power storage element group and the second power storage element group are arranged adjacent to each other in a front-rear direction, the first external terminals are provided at the front edge on the second power storage element group side of the first power storage element group, and the second external terminals 48 are arranged to be adjacent to the first external terminals at a rear edge on the first power storage element group side of the second power storage element group.

3 Claims, 1 Drawing Sheet

(51) Int. Cl.
*H01M 50/503* (2021.01)
*H01M 50/55* (2021.01)
*H01M 50/50* (2021.01)
*H01M 50/298* (2021.01)
*H01M 50/224* (2021.01)

(52) U.S. Cl.
CPC ......... *H01M 50/298* (2021.01); *H01M 50/50* (2021.01); *H01M 50/503* (2021.01); *H01M 50/55* (2021.01)

(56) References Cited

U.S. PATENT DOCUMENTS

| | | |
|---|---|---|
| 2011/0300427 A1 | 12/2011 | Iwasa et al. |
| 2013/0200700 A1 | 8/2013 | Ohkura et al. |
| 2016/0164054 A1 | 6/2016 | Yamamoto et al. |

FOREIGN PATENT DOCUMENTS

| | | |
|---|---|---|
| JP | 2013-137867 | 7/2013 |
| JP | 2014-229585 | 12/2014 |
| JP | 2015-035397 | 2/2015 |
| WO | 2011/105095 | 9/2011 |

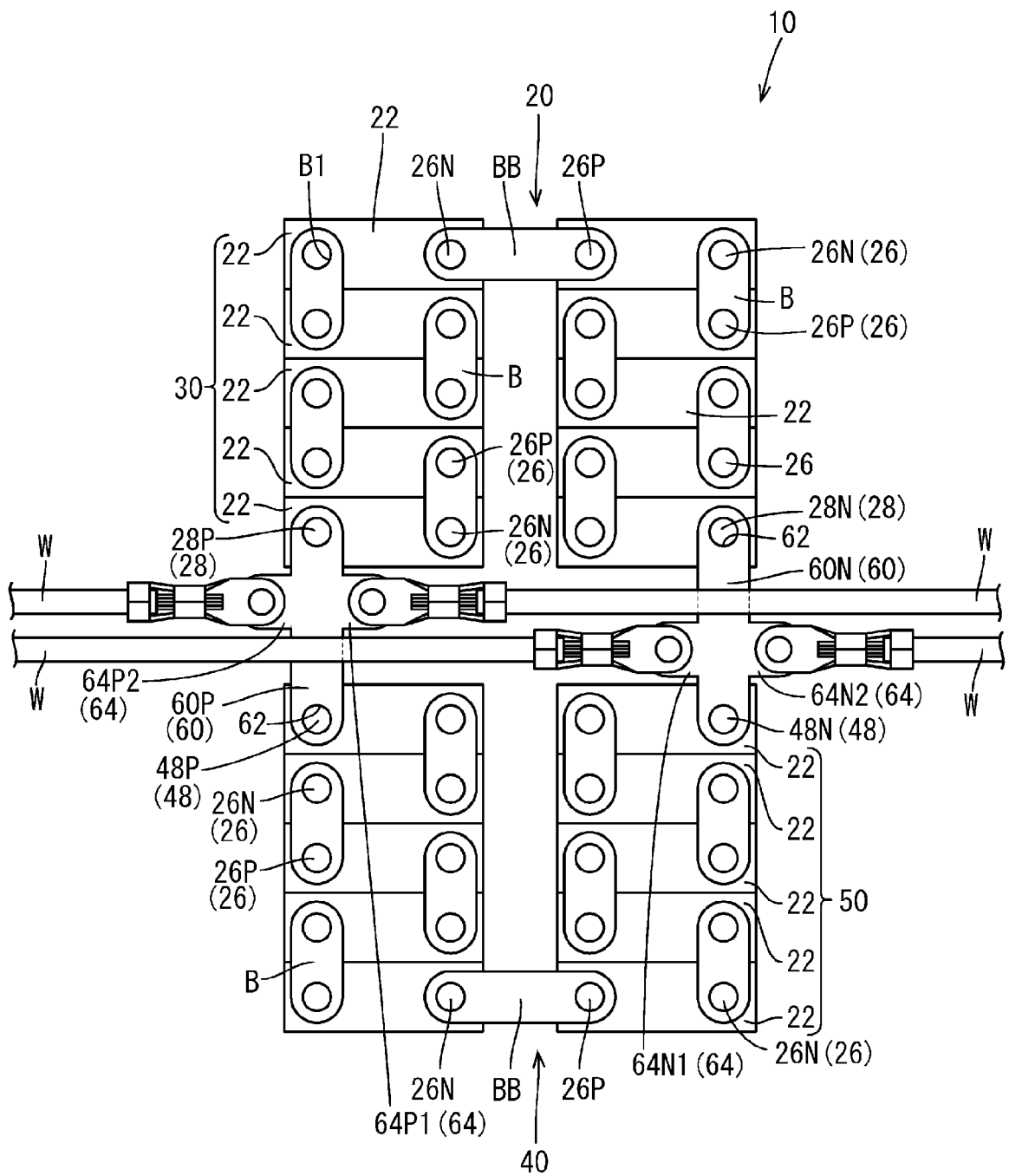

POWER SUPPLY DEVICE

TECHNICAL FIELD

A technique disclosed in the present specification relates to a power supply device.

BACKGROUND ART

For example, the power supply device described in JP 2014-229585A (Patent Document 1 below) is known as a power supply device having a battery group in which a plurality of batteries are arranged side by side in one direction. In this power supply device, different electrodes of adjacent batteries are connected by a bus bar to connect the batteries in series, and external output terminals having different polarities of the battery group are arranged at diagonal positions of the battery group.

The battery assembly described in Japanese Patent No. 5163804 (Patent Document 2 below) is known as a battery assembly in which battery groups formed by stacking a plurality of batteries are connected to each other. In this battery assembly, the battery groups are connected in series by a harness, and the battery groups connected in series are electrically connected to an electric device by the harness. Further, the battery groups of the battery assembly are densely arranged to electrically connect the battery groups to each other, and a connector to be connected to a power cutoff device or the electric device is disposed in the center of the battery groups.

CITATION LIST

Patent Documents

Patent Document 1: JP 2014-229585A
Patent Document 2: Japanese Patent No. 5163804

SUMMARY OF INVENTION

Technical Problem

When the battery groups, in which the external output terminals having different polarities are arranged at the diagonal positions like the battery group of the above power supply device, are connected in series, and an output of the battery groups connected in series is to be provided at the center of the battery groups as in the above battery assembly, a plurality of harnesses or electric wires are required to connect the external output terminals to each other. Therefore, the weight of the battery assembly increases due to an increase in the number of harnesses or electric wires, and the battery assembly increases in size in order to ensure a space for routing the harnesses or electric wires.

This specification discloses a technique for suppressing an increase in the number of electric wires.

Solution to Problem

The technique disclosed in this specification is a power supply device including: a first power storage element group that has a pair of first external terminals having different polarities, and includes a plurality of power storage elements; and a second power storage element group that has a pair of second external terminals having different polarities, and includes a plurality of power storage elements, wherein the first power storage element group and the second power storage element group are arranged adjacent to each other, the first external terminals are provided on the second power storage element group side of the first power storage element group, and the second external terminals are arranged to be adjacent to the first external terminals on the first power storage element group side of the second power storage element group.

According to the power supply device having such a configuration, since the pair of first external terminals of the first power storage element group and the pair of second external terminals of the second power storage element group are arranged so that the first power storage element group and the second power storage element group are adjacent to each other, it is possible to suppress an increase in the number of electric wires in the power supply device. Thus, it is possible to suppress an increase in weight of the power supply device due to the increase in the number of electric wires, and to suppress an increase in size of the power supply device due to ensuring a routing space of the electric wires.

The power supply device disclosed in this specification may also have the following configurations.

It is also possible to use a configuration in which the pair of first external terminals includes a first positive electrode external terminal disposed at one end of an edge on the second power storage element group side of the first power storage element group, and a first negative electrode external terminal disposed at the other end opposite to the one end of the edge on the second power storage element group side of the first power storage element group, and the pair of second external terminals includes a second positive electrode external terminal disposed to be adjacent to the first positive electrode external terminal at an edge on the first power storage element group side of the second power storage element group, and a second negative electrode external terminal disposed to be adjacent to the first negative electrode external terminal at the edge on the first power storage element group side of the second power storage element group.

With such a configuration, it is possible to easily connect the first power storage element group and the second power storage element group in parallel while suppressing the increase in weight of the power supply device and the increase in size of the power supply device. Further, it is possible to ensure an insulation distance by arranging the external terminals having polarities different from each other at positions that are the most spaced apart from each other, with the first power storage element group and the second power storage element group being connected in parallel.

It is also possible to use a configuration in which the first positive electrode external terminal and the second positive electrode external terminal are connected to each other by a total output bus bar disposed between the first power storage element group and the second power storage element group, and the first negative electrode external terminal and the second negative electrode external terminal are connected to each other by a total output bus bar that is different from the total output bus bar disposed between the first power storage element group and the second power storage element group.

With such a configuration, since the first power storage element group and the second power storage element group are connected to each other by a pair of total output busbars, it is possible to suppress the increase in the number of electric wires in the power supply device, and to further suppress the increase in weight of the power supply device and the increase in size of the power supply device.

It is also possible to use a configuration in which each of the total output bus bars has a pair of connecting portions projecting in a direction intersecting a connecting direction, and when the total output bus bar connecting the first positive electrode external terminal and the second positive electrode external terminal is a total positive electrode bus bar and the total output bus bar connecting the first negative electrode external terminal and the second negative electrode external terminal is a total negative electrode bus bar, one of the pair of connecting portions of the total positive electrode bus bar is connected to an electric wire drawn toward the total negative electrode bus bar side, and the other of the pair is connected to an electric wire drawn toward a side opposite to that of the total negative electrode bus bar, and one of the pair of connecting portions of the total negative electrode bus bar is connected to an electric wire drawn toward the total positive electrode bus bar side, and the other of the pair is connected to an electric wire drawn toward a side opposite to that of the total positive electrode bus bar.

With such a configuration, it is possible to supply electric power to the first power storage element group and the second power storage element group on both the total positive electrode bus bar side and the total negative electrode bus bar side. That is, since the electric power is supplied to both the total positive electrode bus bar side and the total negative electrode bus bar side, it is possible to suppress the increase in weight of the power supply device due to the increase in the number of electric wires and the increase in size of the power supply device due to ensuring the routing space of the electric wires.

Advantageous Effects of Invention

According to the technique disclosed in this specification, it is possible to suppress the increase in the number of electric wires.

BRIEF DESCRIPTION OF DRAWINGS

FIG. 1 is a plan view of a power supply device.

DESCRIPTION OF EMBODIMENTS

Embodiment

An embodiment of a technique disclosed in this specification will be described with reference to FIG. 1.

The present embodiment exemplifies a power supply device 10, for example, that is mounted on a vehicle such as an electric vehicle or a hybrid vehicle and is used as a power source for driving the vehicle. In the following description, a front-rear direction is based on an up-down direction in FIG. 1, a lower side in the drawing is the front side, a upper side in the drawing is the rear side, and a left-right direction is the left-right direction in FIG. 1.

As shown in FIG. 1, the power supply device 10 is constituted by including a first power storage element group 20 including a plurality of power storage elements 22, a second power storage element group 40 including a plurality of power storage elements 22, and a pair of total output bus bars 60 connecting the first power storage element group 20 and the second power storage element group 40.

The power storage element 22 is, for example, a secondary battery, is formed in a flat shape as shown in FIG. 1, and is provided with a pair of electrode terminals 26 projecting upward at positions near both left and right ends on an upper surface of the power storage element 22. One of the pair of electrode terminals 26 is a positive electrode terminal 26P and the other is a negative electrode terminal 26N. Each electrode terminal 26 is formed in a substantially columnar shape with screw threads formed on its outer surface.

The first power storage element group 20 is formed by arranging power storage blocks 30 side by side in two rows in the left-right direction, the power storage blocks 30 being obtained by arranging multiple power storage elements 22 side by side in the front-rear direction. Although not shown, the power storage blocks 30 arranged side by side in two rows in the left-right direction are kept aligned by being installed and fixed to, for example, a metal frame or tray.

Each of the power storage blocks 30 is configured such that, in two power storage elements 22 adjacent to each other in the front-rear direction, electrode terminals 26 having different polarities are arranged in a line in the front-rear direction so as to be adjacent to each other (that is, so that the positive electrode terminal 26P of one power storage element 22 and the negative electrode terminal 26N of another power storage element 22 adjacent to the positive electrode terminal 26P are adjacent to each other). Then, the power storage elements 22 of each of the power storage blocks 30 are connected in series by connection bus bars B that connect the positive electrode terminals 26P and the negative electrode terminals 26N of the power storage elements 22 adjacent to each other in the front-rear direction.

The connection bus bar B is formed by pressing a metal plate material made of copper, copper alloy, stainless steel (SUS), aluminum or the like into a predetermined shape. As shown in FIG. 1, the connection bus bar B has a substantially rectangular flat plate shape with four rounded corners, and in the connection bus bar B, a pair of circular through-holes B1 into which the positive and negative electrode terminals 26 of the power storage element 22 are inserted are formed therethrough in the vertical direction. The through-hole B1 is set to be slightly larger than an outer diameter of the electrode terminal 26, and by tightening a nut (not shown) with the electrode terminal 26 penetrating the through-hole B1, the electrode terminal 26 and the connection bus bar B are electrically connected.

The power storage elements 22 arranged at the rearmost part of the power storage blocks 30 adjacent to each other in the left-right direction are configured such that electrode terminals 26 of different polarities are adjacent to each other (that is, such that the negative electrode terminal 26N of the power storage element 22 on the left and the positive electrode terminals 26P of the power storage element 22 on the right are adjacent to each other), and the adjacent electrode terminals 26 are connected to each other by an inter-block connection bus bar BB, so that all the power storage elements 22 of the first power storage element group 20 are connected in series. Note that although the inter-block connection bus bar BB is formed slightly longer than the connection bus bar B in the left-right direction, which is the connecting direction, other configurations are the same as those of the connection bus bar B, and thus description thereof will be omitted.

When all the power storage elements 22 of the first power storage element group 20 are connected in series, the electrode terminal 26 on the left side of the power storage element 22 disposed at the frontmost part of the power storage block 30 on the left is constituted as a first positive electrode external terminal 28P, which is a positive electrode output terminal of the first power storage element group 20, and the electrode terminal 26 on the right side of the power storage element 22 disposed at the frontmost part of the power storage block 30 on the right is constituted as a first negative electrode external terminal 28N, which is a negative electrode output terminal of the first power storage element group 20.

That is, the first power storage element group 20 has a pair of first external terminals 28, the first positive electrode external terminal 28P of the pair of first external terminals 28 is provided on the left end at the front edge of the first power storage element group 20, and the first negative electrode external terminal 28N is provided on the right end opposite to the left end at the front edge of the first power storage element group 20.

On the other hand, like the first power storage element group 20, the second power storage element group 40 is formed by arranging power storage blocks 50 side by side in two rows in the left-right direction, the power storage blocks 50 being obtained by arranging multiple power storage elements 22 side by side in the front-rear direction. Note that, similarly to the first power storage element group 20, in the second power storage element 40 as well, the power storage blocks 50 arranged side by side in two rows in the left-right direction are kept aligned by being installed and fixed to, for example, the metal frame or tray, although this is not shown in the drawing.

Each of the power storage blocks 50 is configured such that, in two power storage elements 22 adjacent to each other in the front-rear direction, electrode terminals 26 having different polarities are arranged in a line in the front-rear direction so as to be adjacent to each other (that is, so that the positive electrode terminal 26P of one power storage element 22 and the negative electrode terminal 26N of another power storage element 22 adjacent to the positive electrode terminal 26P are adjacent to each other). Then, the power storage elements 22 of each of the power storage blocks 50 are connected in series by connection bus bars B that connect the positive electrode terminals 26P and the negative electrode terminals 26N of the power storage elements 22 adjacent to each other in the front-rear direction.

The power storage elements 22 arranged at the frontmost part of the power storage blocks 50 adjacent to each other in the left-right direction are configured such that electrode terminals 26 of different polarities are adjacent to each other (that is, such that the negative electrode terminal 26N of the power storage element 22 on the left and the positive electrode terminal 26P of the power storage element 22 on the right are adjacent to each other), and the adjacent electrode terminals 26 are connected to each other by an inter-block connection bus bar BB, so that all the power storage elements 22 of the second power storage element group 40 are connected in series.

When all the power storage elements 22 of the second power storage element group 40 are connected in series, the electrode terminal 26 on the left side of the power storage element 22 located at the rearmost part of the power storage block 50 on the left is constituted as a second positive electrode external terminal 48P, which is a positive electrode output terminal of the second power storage element group 40, and the electrode terminal 26 on the right side of the power storage element 22 located at the rearmost part of the power storage block 50 on the right is constituted as a second negative electrode external terminal 48N, which is a negative electrode output terminal of the second power storage element group 40.

That is, the second power storage element group 40 has a pair of second external terminals 48, the second positive electrode external terminal 48P of the pair of second external terminals 48 is provided on the left end at the rear edge of the second power storage element group 40, and the second negative electrode external terminal 48N is provided on the right end opposite to the left end at the rear edge of the second power storage element group 40.

The second power storage element group 40 is disposed in front of and adjacent to the first power storage element group 20, and the first positive electrode external terminal 28P and the first negative electrode external terminal 28N of the first power storage element group 20 are connected to the second positive electrode external terminal 48P and the second negative electrode external terminal 48N of the second power storage element group 40 by the pair of total output bus bars 60.

In the second power storage element group 40, the second positive electrode external terminal 48P is disposed in front of the first positive electrode external terminal 28P so as to be adjacent to the first positive electrode external terminal 28P of the first power storage element group 20 in the front-rear direction, and the second negative electrode external terminal 48N is disposed in front of the first negative electrode external terminal 28N so as to be adjacent to the first negative electrode external terminal 28N of the first storage element group 20 in the front-rear direction.

The total output bus bar 60 is formed by pressing a metal plate material made of copper, copper alloy, stainless steel (SUS), aluminum or the like into a predetermined shape. As shown in FIG. 1, the total output bus bar 60 has a substantially rectangular flat plate shape that is long in the front-rear direction. Four corners of the front and rear of the total output bus bar 60 are rounded, and a pair of electrode insertion holes 62 having a circular shape are provided penetrating in the vertical direction through both front and rear ends of the total output bus bar 60.

In the pair of total output bus bars 60, the total output bus bar 60 disposed at the left end of the first power storage element group 20 and the second power storage element group 40 is a total positive electrode bus bar 60P, the first positive electrode external terminal 28P and the second positive electrode external terminal 48P are inserted into the pair of electrode insertion holes 62 of the total positive electrode bus bar 60P, and the first positive electrode external terminal 28P and the second positive electrode external terminal 48P are connected in parallel by tightening a nut (not shown).

On the other hand, in the pair of total output bus bars 60, the total output bus bar 60 disposed at the right end of the first power storage element group 20 and the second power storage element group 40 is a total negative electrode bus bar 60N, the first negative electrode external terminal 28N and the second negative electrode external terminal 48N into the pair of electrode insertion holes 62 of the total negative electrode bus bar 60N, and the first negative electrode external terminal 28N and the second negative electrode external terminal 48N are connected in parallel by tightening a nut (not shown).

A pair of connecting portions 64 extending in a direction intersecting a direction in which the first external terminal 28 and the second external terminal 48 are connected are provided on both left and right edges of the total output bus bar 60.

One of the pair of connecting portions 64 of the total positive electrode bus bar 60P is a positive electrode-side right connecting portion 64P1 provided projecting to the right side, which is the total negative electrode bus bar 60N side, and the other of the pair is a positive electrode-side left connecting portion 64P2 provided projecting to the left side, which is the side opposite to that of the total negative electrode bus bar 60N.

An electric wire W drawn outward to the right of the power supply device 10 over the total negative electrode bus bar 60N is connected to the positive electrode-side right connecting portion 64P1, and an electric wire W drawn outward to the left of the power supply device 10 is connected to the positive electrode-side left connecting portion 64P2.

On the other hand, one of the pair of connecting portions 64 of the total negative electrode bus bar 60N is a negative electrode-side left connecting portion 64N1 provided projecting to the left side, which is the total positive electrode bus bar 60P side, and the other of the pair is a negative electrode-side right connecting portion 64N2 provided projecting to the right side, which is the side opposite to that of the total positive electrode bus bar 60P.

An electric wire W drawn outward to the left of the power supply device 10 over the total positive electrode bus bar 60P is connected to the negative electrode-side left connecting portion 64N1, and an electric wire W drawn outward to the right of the power supply device 10 is connected to the negative electrode-side right connecting portion 64N2.

The present embodiment is configured as described above, and subsequently, the operation and effect of the power supply device 10 will be described.

The first power storage element group 20 and the second power storage element group 40 in the present embodiment are arranged adjacent to each other in the front-rear direction, the first positive electrode external terminal 28P of the first power storage element group 20 and the second positive electrode external terminal 48P of the second power storage element group 40 are adjacent to each other in the front-rear direction, and the first negative electrode external terminal 28N of the first power storage element group 20 and the second negative electrode external terminal 48N of the second power storage element group 40 are arranged adjacent to each other in the front-rear direction.

Also, the first positive electrode external terminal 28P and the second positive electrode external terminal 48P are connected in parallel by the total positive electrode bus bar 60P, and the first negative electrode external terminal 28N and the second negative electrode external terminal 48N are connected in parallel by the total negative electrode bus bar 60N.

That is, since the first power storage element group 20 and the second power storage element group 40 are connected in parallel without using the electric wire W, it is possible to suppress an increase in the number of harnesses or electric wires W in the power supply device 10, for example, as compared with the case where a power supply device is formed by a pair of power storage element groups in which external terminals are arranged diagonally, and each external terminal is connected by a harness or an electric wire. Thus, it is possible to suppress an increase in weight due to the increase in the number of harnesses or electric wires W, and to suppress an increase in size of the power supply device 10 due to ensuring a routing space of the harnesses or electric wires W.

A position of the total positive electrode bus bar 60P connecting the first positive electrode external terminal 28P and the second positive electrode external terminal 48P in parallel, and a position of the total negative electrode bus bar 60N connecting the first negative electrode external terminal 28N and the second negative electrode external terminal 48N in parallel, are arranged at both end portions (left end portion and right end portion) of side edge portions adjacent to each other in the first power storage element group 20 and the second power storage element group 40.

That is, even when the storage elements 22 are connected in series in each of the power storage element groups 20 and 40, and the first power storage element group 20 and the second power storage element group 40 are connected in parallel, whereby a voltage difference between the total positive electrode bus bar 60P and the total negative electrode bus bar 60N increases, it is possible to ensure an insulation distance by arranging the total positive electrode bus bar 60P and the total negative electrode bus bar 60N having polarities different from each other at positions that are the most spaced apart from each other, with the first power storage element group 20 and the second power storage element group 40 connected in parallel.

According to the present embodiment, the total positive electrode bus bar 60P includes the positive electrode-side right connecting portion 64P1 to which the electric wire W drawn outward to the left of the power supply device 10 over the total negative electrode bus bar 60N is connected, and the positive electrode-side left connecting portion 64P2 to which the electric wire W drawn outward to the right of the power supply device 10 is connected.

On the other hand, the total negative electrode bus bar 60N has the negative electrode-side left connecting portion 64N1 to which the electric wire W drawn outward to the left of the power supply device 10 over the total positive electrode bus bar 60P is connected, and the negative electrode side right connecting portion 64N2 to which the electric wire W drawn outward to the right of the power supply device 10 is connected.

That is, according to the present embodiment, it is possible to supply power to the first power storage element group 20 and the second power storage element group 40 on both the left side, which is the total positive electrode bus bar 60P side, and the right side, which is the total negative electrode bus bar 60N side.

Further, only the electric wire W drawn from the positive electrode-side right connecting portion 64P1 to the right side of the power supply device 10 and the electric wire W drawn from the negative electrode-side left connecting portion 64N1 to the left side of the power supply device 10 are arranged between the first power storage element group 20 and the second power storage element group 40.

Therefore, the number of electric wires W can be reduced, for example, as compared with the case where electric wires respectively connecting a pair of external terminals of the first power storage element group and a pair of external terminals of the second power storage element group in parallel, and electric wires for supplying electric power to both sides of the power supply device after connecting the first power storage element group and the second power storage element group in parallel, are separately routed. Thus, it is possible to further suppress the increase in weight due to the increase in the number of electric wires W, and to further suppress the increase in size of the power supply device 10 due to ensuring the routing space of the electric wires W.

Other Embodiments

The technique disclosed in this specification is not limited to the embodiment described with reference to the above description and drawings, but includes various aspects such as the following.

(1) In the above-described embodiment, the first power storage element group 20 and the second power storage element group 40 are formed by arranging the power storage blocks 30 and 50 side by side in two rows in the left-right direction, the power storage blocks 30 and 50 each being formed by arranging the power storage elements 22 side by side in the front-rear direction. However, the present invention is not limited to this, and a power storage element group including one or four or more power storage blocks may also be formed by forming a power storage block in which the power storage elements are arranged side by side in the left-right direction or in the front-rear direction.

(2) In the above-described embodiment, a configuration was used in which the pair of first external terminals 28 of the first power storage element group 20 and the pair of second external terminals 48 of the second power storage element group 40 are connected in parallel. However, the present invention is not limited to this, and it is also possible to use a configuration in which the pair of first external terminals of the first power storage element group and the pair of second external terminals of the second power storage element group are connected in series.

(3) In the above-described embodiment, a configuration was used in which the first positive electrode external terminal 28P and the second positive electrode external terminal 48P are connected by the total positive electrode bus bar 60P, and the first negative electrode external terminal 28N and the second negative electrode external terminal 48N are connected by the total negative electrode bus bar 60N. However, the present invention is not limited to this, and it is also possible to use a configuration in which a connection between the first positive electrode external terminal and the second positive electrode external terminal, and a connection between the first negative electrode external terminal and the second negative electrode external terminal are made by short electric wires.

(4) In the above-described embodiment, a configuration was used in which the electrode terminals 26 of the power storage elements 22 are inserted into the bus bars B, BB, and 60, and the nuts are tightened to connect the bus bars B, BB, and 60 to the electrode terminals 26. However, the present invention is not limited to this, it is also possible to use a configuration in which the bus bars are connected to the electrode terminals of the power storage elements through ultrasonic welding or laser welding.

LIST OF REFERENCE NUMERALS

10 Power supply device
20 First power storage element group
22 Power storage element
28 First external terminal
28N First negative electrode external terminal
28P First positive electrode external terminal
40 Second power storage element group
48 Second external terminal
48N Second negative electrode external terminal
48P Second positive electrode external terminal
60 Total output bus bar
60N Total negative electrode bus bar
60P Total positive electrode bus bar
64 Connecting portion
64N1 Negative electrode-side left connecting portion
64N2 Negative electrode-side right connecting portion
64P1 Positive electrode-side right connecting portion
64P2 Positive electrode-side left connecting portion
W Electric wire.

The invention claimed is:

1. A power supply device, comprising:
a first power storage element group that has a pair of first external terminals having different polarities, and includes a first plurality of power storage elements; and
a second power storage element group that has a pair of second external terminals having different polarities, and includes a second plurality of power storage elements, wherein
the first power storage element group and the second power storage element group are arranged adjacent to each other,
the first external terminals are provided on the second power storage element group side of the first power storage element group,
the second external terminals are arranged to be adjacent to the first external terminals on the first power storage element group side of the second power storage element group,
the pair of first external terminals includes a first positive electrode external terminal disposed at one end of an edge on the second power storage element group side of the first power storage element group, and a first negative electrode external terminal disposed at the other end opposite to the one end of the edge on the second power storage element group side of the first power storage element group, and
the pair of second external terminals includes a second positive electrode external terminal disposed to be adjacent to the first positive electrode external terminal at an edge on the first power storage element group side of the second power storage element group, and a second negative electrode external terminal disposed to be adjacent to the first negative electrode external terminal at the edge on the first power storage element group side of the second power storage element group.

2. The power supply device according to claim 1, wherein
the first positive electrode external terminal and the second positive electrode external terminal are connected to each other by a first total output bus bar disposed between the first power storage element group and the second power storage element group, and
the first negative electrode external terminal and the second negative electrode external terminal are connected to each other by a second total output bus bar disposed between the first power storage element group and the second power storage element group.

3. The power supply device according to claim 2, wherein
each of the first and second total output bus bars has a pair of connecting portions projecting in a direction intersecting a connecting direction, and
when the first total output bus bar connecting the first positive electrode external terminal and the second positive electrode external terminal is a total positive electrode bus bar and the second total output bus bar connecting the first negative electrode external terminal and the second negative electrode external terminal is a total negative electrode bus bar,
one of the pair of connecting portions of the total positive electrode bus bar is connected to an electric wire drawn toward the total negative electrode bus bar side, and the other of the pair of connecting portions is connected to an electric wire drawn toward a side opposite to that of the total negative electrode bus bar, and one of the pair of connecting portions of the total negative electrode bus bar is connected to an electric wire drawn toward the total positive electrode bus bar side, and the other of the pair of connecting portions is connected to an electric wire drawn toward a side opposite to that of the total positive electrode bus bar.

\* \* \* \* \*